J. A. MILLER.
BALANCE FOR TIME PIECES.

No. 248,050. Patented Oct. 11, 1881.

WITNESSES:
Wm. L. Cox
Joseph A. Miller Jr.

INVENTOR:
John A. Miller
by Joseph A. Miller
atty

UNITED STATES PATENT OFFICE.

JOHN A. MILLER, OF GRAND CROSSING, ILLINOIS.

BALANCE FOR TIME-PIECES.

SPECIFICATION forming part of Letters Patent No. 248,050, dated October 11, 1881.

Application filed December 24, 1880. (No model.)

*To all whom it may concern:*

Be it known that I, JOHN A. MILLER, of Grand Crossing, county of Cook, and State of Illinois, have invented a new and useful Improvement in Balances for Time-Meters; and I hereby declare that the following is a full, clear, and exact description of the same, reference being had to the accompanying drawings, forming part of this specification.

This invention has reference to an improvement in the balance for watches, clocks, or other instruments for measuring time.

The object of this invention is to provide against the variation of the movement of the balance by the expansion or contraction.

Another object of this invention is to prevent polarization or magnetic attraction in the balance, and a further object of the invention is to cheapen the cost of the balances.

The invention consists in mounting the adjustable weights of a balance on a circular rim, made of a material not affected by a variation of temperature.

It further consists in constructing such circular rim out of thin sheets, as will be more fully set forth hereinafter.

Figure 1:
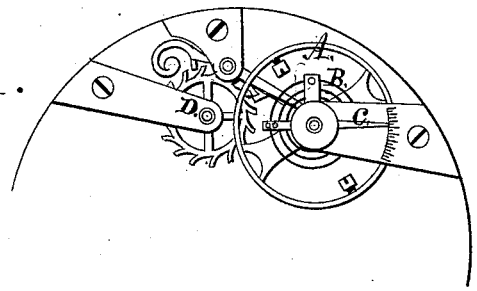
Figure 2:
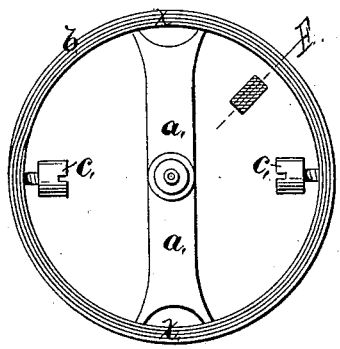
Figure 3:
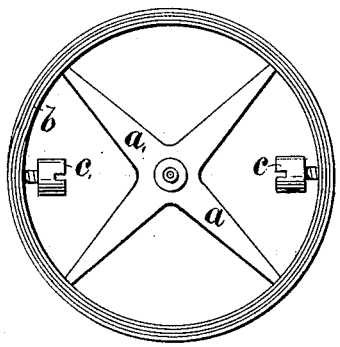
Figure 4:
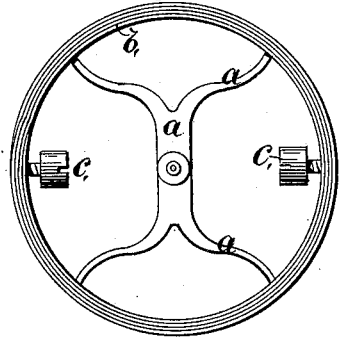

Figure 1 represents the escapement of a watch or clock, showing the position of the balance and its relation to the hair-spring, the adjusting device, and the escapement proper. Fig. 2 represents one form of my improved balance, in view and section. Figs. 3 and 4 represent modifications in the method for mounting the balance.

In the drawings, A represents the balance. B is the hair-spring; C, the regulating device, by means of which the tension on the hair-spring is adjusted, and thereby the time of each oscillation of the balance regulated, so as to accelerate or retard the measurement of time.

Balances as heretofore constructed are liable to variation in the measurement of time from two causes: first, by the expansion or contraction caused by the variation in temperature, by which the adjustable balance-weights are brought farther from or closer to the center of the balance; and, second, by local attraction caused by magnetic action of the balance, which magnetic action or polarization may be a constant quantity residing in the balance or be induced by heat, friction, or other causes.

Balance-wheels as heretofore used are made of metal, (usually steel,) and have adjustable metal weights secured to the circular rim. Such metal rims expand and contract under a variation of temperature, and, however slight such variation may be, it causes considerable variation in the watch in a day, week, or month; and when the balance-wheel is made of steel the same is liable to become a magnet of more or less attractive or repellent power by the turning, stamping, polishing, or other operations in the course of construction, and will have a constant or varying local attractive or repellent force interfering with the accurate motion required in a time-meter, and particularly in that part making the greatest number of movements, and whose movements form the standard of the measurement.

To avoid these difficulties and produce an unvarying standard, I remove the causes producing the variation and construct the rim of my improved balance-wheel of a material not affected by a variation in temperature and not magnetic or liable to become magnetic, such as properly-prepared wood, paper, hard rubber, celluloid, and similar material.

As in watches required to measure time accurately a large number of adjustable weights are desirable, I prefer to make my balances with a circular rim, into which the adjustable weights may be secured and a large number readily placed on the rim, as heretofore.

In the drawings, Figs. 2, 3, and 4 represent balances on an enlarged scale. $a\,a$ represent the arms extending from the hoop to the rim $b$. These arms, when made of metal, may be of any desired form, as is shown in the different figures; and when the adjustable weights $c\,c$ are equally distributed on the rim the expansion or contraction of the arms will not change the position of the average of all the weights, even when the arms are rigidly secured. If we take Fig. 2 and place two adjustable weights at X X, then the expansion of the arms $a\,a$ will move the weights at X X from the center and the weights $c\,c$ toward the center. The average weight will be at the same distance from the center as before the expansion.

The arms *a a* may be curved, so as to allow a slight yielding under expansion or contraction, and the arms may be made of a material not liable to variations under a change in temperature.

When the rim *b* of the balance is made of wood, I prepare the material by coagulating the albumen in the wood in any of the well-known methods used for preparing and seasoning wood, by steaming or otherwise, and then filling the pores with varnish or other liquid not affected by a variation in temperature or moisture.

Having thus described my invention, I claim as new and desire to secure by Letters Patent—

A balance for a time-meter, consisting of a circular rim, made of wood, hard rubber, celluloid, or similar material, and mounted on metallic arms *a a*, substantially as and for the purpose set forth.

JNO. A. MILLER.

Witnesses:
 A. TROELLER,
 J. S. SCOVEL.